United States Patent [19]
Wiseman

[11] Patent Number: 5,932,816
[45] Date of Patent: Aug. 3, 1999

[54] ENGINE POWER TEST STAND

[76] Inventor: Robert J. Wiseman, 2298 W. Renaissance Ave., Apache Junction, Ariz. 85220

[21] Appl. No.: 09/097,063

[22] Filed: Jun. 12, 1998

[51] Int. Cl.⁶ ........................................................ G01L 1/00
[52] U.S. Cl. ........................................................ 73/862.541
[58] Field of Search ....................... 73/862.541, 862.621, 73/432.1, 862.392, 117.4; 177/154, 225, 231; 269/71, 73

[56] References Cited

U.S. PATENT DOCUMENTS

| | | | |
|---|---|---|---|
| 2,111,315 | 3/1938 | Damblanc | 73/117.4 |
| 3,038,331 | 6/1962 | Henry et al. | 73/117.4 |
| 3,122,917 | 3/1964 | Ormond | 73/117.4 |
| 3,169,594 | 2/1965 | Myers | 177/225 |
| 3,210,991 | 10/1965 | Weekley | 73/117.4 |
| 3,213,680 | 10/1965 | Schaefer | 73/117.4 |
| 3,218,849 | 11/1965 | Marvinney et al. | 73/117.4 |
| 3,295,366 | 1/1967 | Von Pragenau et al. | 73/117.4 |
| 4,116,432 | 9/1978 | Feeney | 273/31 A |
| 4,537,647 | 8/1985 | Foster . | |
| 4,663,967 | 5/1987 | Parkinson . | |
| 4,788,855 | 12/1988 | Laskody | 73/117.4 |
| 5,178,003 | 1/1993 | Wesorick | 73/118.1 |
| 5,461,929 | 10/1995 | Jordan | 73/862.392 X |

FOREIGN PATENT DOCUMENTS

| | | |
|---|---|---|
| 0608066 | 5/1978 | U.S.S.R. . |
| 2096776 | 10/1982 | United Kingdom . |

Primary Examiner—George Dombroske
Assistant Examiner—Jewel Thompson
Attorney, Agent, or Firm—Parsons & Goltry; Robert A. Parsons; Michael W. Goltry

[57] ABSTRACT

A test stand for model airplane engines consisting of a base and a plate movable in relation to the base. The plate has parallel sides, a first end and a second end. Bearings are disposed between the plate and the base to facilitate movement of the plate. The base has flanges which overlap the sides of the plate to couple the plate with the base. A member attached to the plate forms a shoulder which engages one of the flanges of the base to limit the movement of the plate. The plate has a peripheral slot at the first end, and a plurality of openings adjacent the peripheral slot whereby an engine may be positioned in the slot with its propeller adjacent the first end and bolts inserted through the openings to secure the engine to the plate. A spring scale with a spring biased extensible portion is secured to the plate with the extensible portion attached to the base such that the force exerted to move the plate in relation to the base may be measured.

6 Claims, 3 Drawing Sheets

ENGINE POWER TEST STAND

The present invention relates to test stand for model airplane engines.

BACKGROUND OF THE INVENTION

The building and flying of radio controlled model airplanes has become a popular past time. Many models require a very gradual rate of climb after take off. Most operators do not possess a sufficient degree of skill to negotiate a gradual climb and airplanes frequently stall during takeoff on their inaugural flight.

The applicant has determined that such stalling can be avoided if the static thrust of the airplane engine approaches the weight of the aircraft. The static thrust produced by the airplane is the product of the size and pitch of the propeller, engine adjustment, fuel mixture used and exhaust system design.

SUMMARY OF THE INVENTION

What is required is a test stand which can be used to measure the static thrust of the engine of the model airplane.

According to the invention there is provided a test stand for model airplane engines which is comprised of a base and a member movable in relation to the base. Means are provided for coupling the movable member and the base. Means are attached to the base for limiting the movement of the movable member. Means are provided for mounting an engine on the movable member. Means are provided for measuring the force exerted to move the movable member having one end attached to the base and an opposed end attached to the movable member.

Although beneficial results may be obtained using the test stand described, even more beneficial results may be obtained if the structure of the stand is kept as simple as possible. The applicant has found that this is most readily accomplished by the preferred feature of having the movable member in the form of a plate.

Although beneficial results may be obtained using the test stand described, even more beneficial results may be obtained if friction, which tends to distort the readings obtained, is reduced. This is accomplished by the preferred feature of having bearings disposed between the plate and the base to facilitate movement of the plate.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
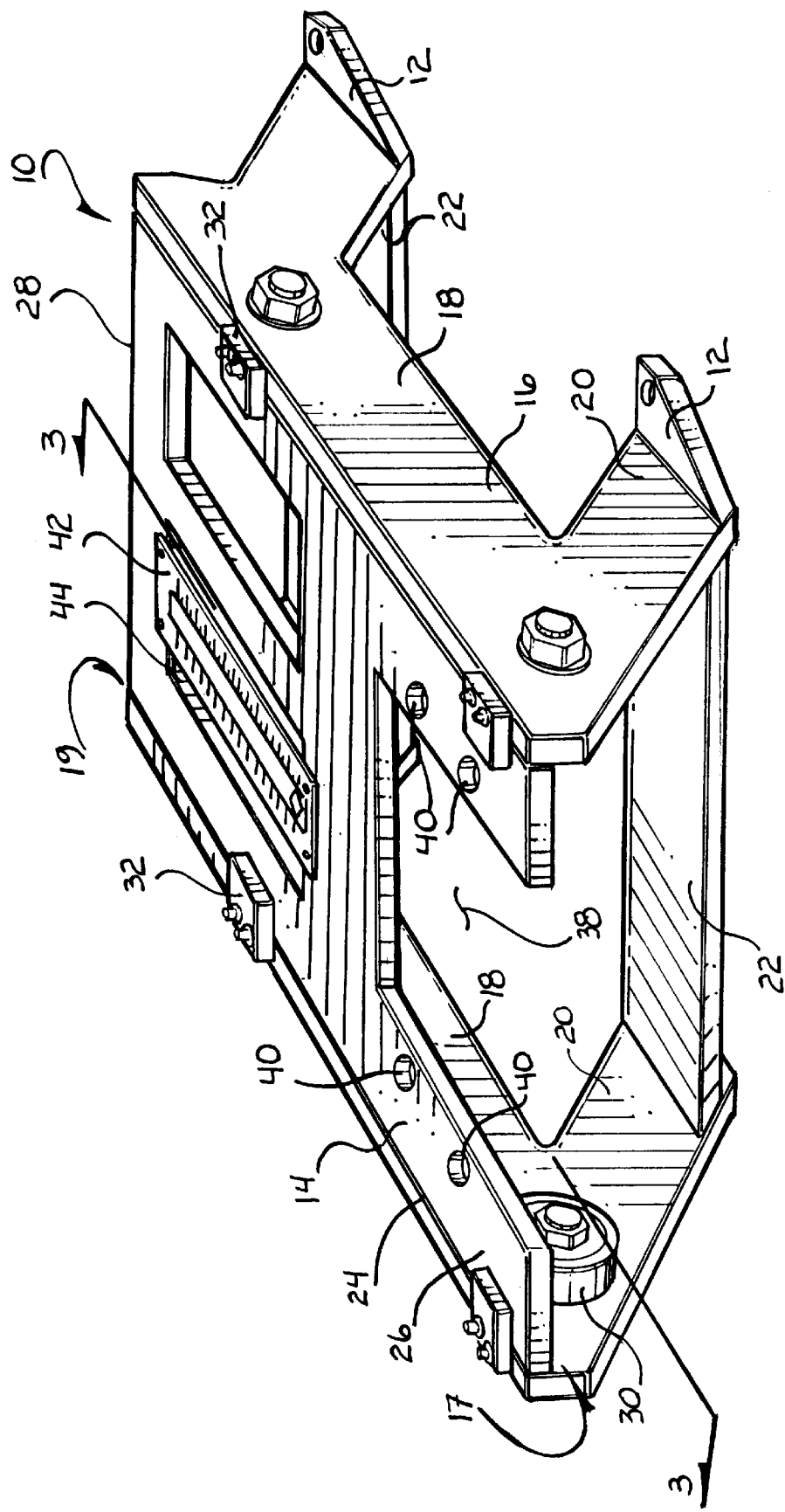
FIG. 1 is a perspective view of a test stand for a model airplane according to the present invention.
Figure 2:
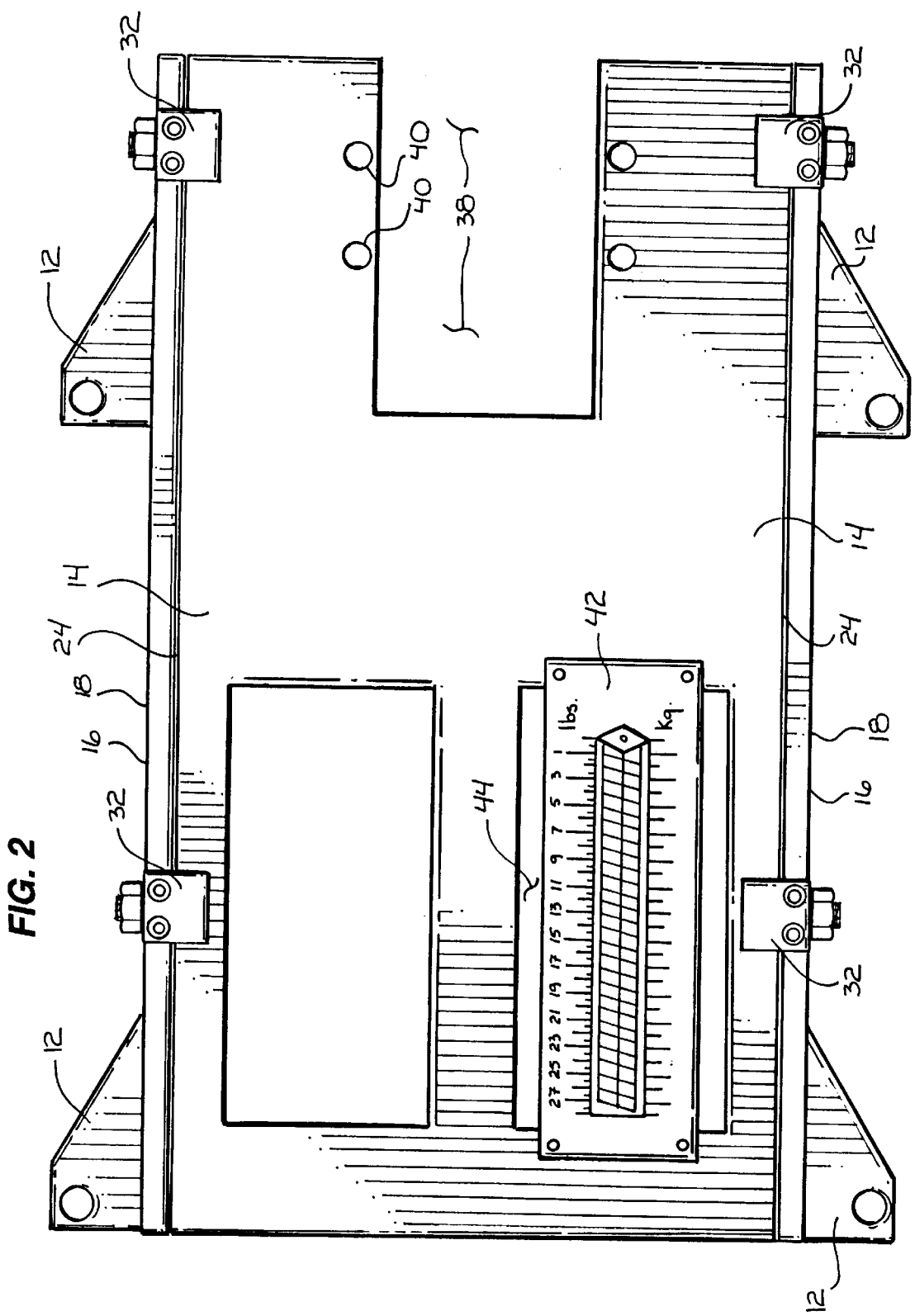
FIG. 2 is a top plan view of the test stand of FIG. 1.
Figure 3:
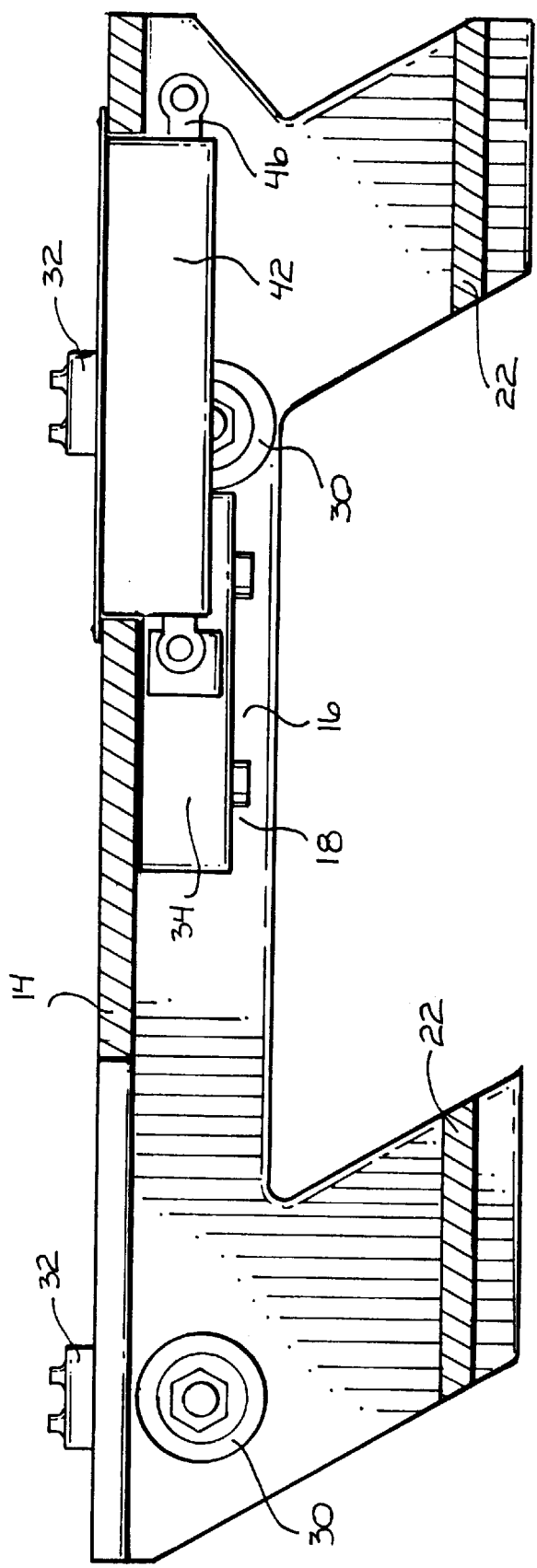
FIG. 3 is a section view taken along section lines 3—3 of FIG. 1.

The preferred embodiment will now be described with reference to FIGS. 1 through 3. The preferred embodiment, generally designated by reference numeral 10, is a test stand for model airplane engines.

The primary components of engine stand 10 are a base 16 and a movable member in the form of a plate 14. Base 16 consists of a pair of parallel side rails 18 having support legs 20. Side rails 18 are connected by transverse members 22. For the purpose of this description base 16 can be considered to have a front 17 and a back 19. Plate 14 has parallel sides 24, a first end 26 and a second end 28. Bearing rollers 30 are mounted to side rails 18 of base 16. Plate 14 rests on rollers 30. Base 16 has flanges in the form of tab retainers 32 which overlap sides 24 of plate 14. A stop member in the form of bar 34 is attached to plate 14. First end 26 of plate 14 has a peripheral slot 38. A plurality of openings 40 are located adjacent peripheral slot 38. A spring scale 42 is positioned in an opening 44 in plate 14 and secured to plate 14. Spring scale 42 has an extensible portion 46 attached by a bolt to one of side walls 18 of base 16.

The operation of engine stand 10 will now be described with reference to FIGS. 1 through 3. Plate 14 is movable on rollers 30 between front 17 and back 19 of base 16. Tab retainers 32 couple plate 14 with base 16 and prevent plate 14 from jumping off rollers 30 or moving laterally. As plate 14 moves between front 17 and back 19 of base 16, bar 34 engages limits movement of plate 14 by engaging rollers 30 which serve as shoulders projecting from side walls 18 at ends 17 and 19 of the base 16. An Engine (not shown) is positioned in slot 38 at end 26 of plate 14 and is secured in position by bolts (not shown) inserted through openings 40. The Engine (not shown) is then connected to a fuel source (not shown) and activated. As the engine operates plate 14 slides toward front 17 of base 16 on rollers 30. The force exerted by the engine (not shown) to move plate 14 in relation to base 16 is measured by scale 42.

If the measurement is less than desired the engine is turned off and adjustments made to it prior to re-testing. The adjustments may involve altering the fuel mixture, changing the propeller (if the motor has a propeller), or other measures to improve engine performance.

It will be apparent to one skilled in the art that the movable member may be modified and need not be a plate as described. It will also be apparent to one skilled in the art that bearings or other means can be used to couple plate 14 to base 16 instead of tab retainers 32. It will also be apparent to one skilled in the art that the stop member can be modified to engage tab retainers 32 or other projecting shoulders on base 16. It finally be apparent to one skilled in the art that other modifications may be made to the preferred embodiment without departing from the spirit and scope of the invention.

The embodiments of the invention in which an exclusive property or privilege is claimed are defined as follows:

1. A test stand for model airplane engines, comprising:
    a. a base;
    b. a plate movable in relation to the base, the plate having parallel sides and the base having flanges which overlap the sides of the plate to couple the plate with the base;
    c. means for coupling the movable member and the base;
    d. means attached to the base for limiting the movement of the movable member;
    e. means for mounting an engine on the movable member;
    f. means for measuring the force exerted to move the movable member in relation to the base.

2. The test stand as defined in claim 1, the plate having a first end with a peripheral slot, and a plurality of openings adjacent the peripheral slot whereby a small engine may be positioned in the slot and bolts inserted through the openings to secure the engine to the plate.

3. The test stand as defined in claim 1, having a spring scale with a spring biased extensible portion secured to the plate with the extensible portion attached to the base such that the force exerted to move the plate in relation to the base may be measured.

4. A test stand for model airplane engines, comprising:
  a. a base;
  b. a plate movable in relation to the base, bearings being disposed between the plate and the base to facilitate movement of the plate;
  c. means for coupling the movable member and the base;
  d. means attached to the base for limiting the movement of the movable member;
  e. means for mounting an engine on the movable member;
  f. means for measuring the force exerted to move the movable member in relation to the base.

5. A test stand for model airplane engines, comprising:
  a. a base;
  b. a plate movable in relation to the base, a stop member attached to the plate which limits movement of the plate by engaging shoulders at either end of the base;
  c. means for coupling the movable member and the base;
  d. means attached to the base for limiting the movement of the movable member;
  e. means for mounting an engine on the movable member;
  f. means for measuring the force exerted to move the movable member in relation to the base.

6. A test stand for model airplane engines, comprising:
  a. a base;
  b. a plate having parallel sides, a first end and a second end, the plate being movable in relation to the base;
  c. bearings disposed between the plate and the base to facilitate movement of the plate;
  d. the base having flanges which overlap the sides of the plate to couple the plate with the base;
  e. a stop member attached to the plate which limits the movement of the plate by engaging shoulders at either end of the base;
  f. the plate having a first end with a peripheral slot, and a plurality of openings adjacent the peripheral slot whereby a small engine may be positioned in the slot with its propeller adjacent the first end and bolts inserted through the openings to secure the engine to the plate; and
  g. a spring scale with a spring biased extensible portion secured to the plate with the extensible portion attached to the base such that the force exerted to move the plate in relation to the base may be measured.

\* \* \* \* \*